H. E. HEATH.
DRIVING MECHANISM.
APPLICATION FILED JUNE 19, 1915.
1,351,999. Patented Sept. 7, 1920.
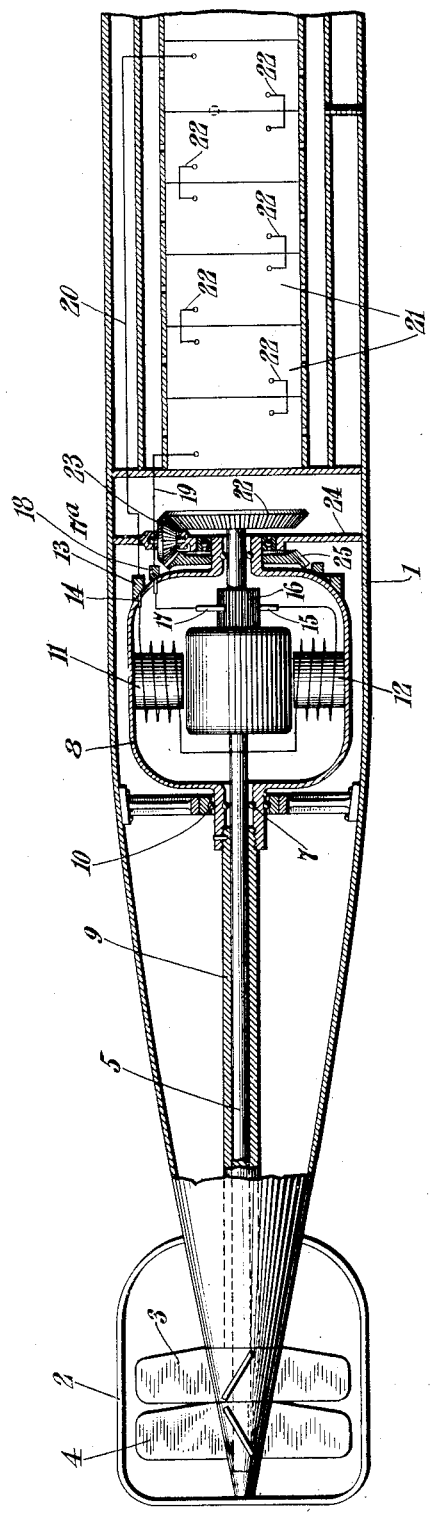
INVENTOR
Harry E. Heath
BY
Pindle, Wright & Sewell
ATTORNEY

UNITED STATES PATENT OFFICE.

HARRY E. HEATH, OF NEWARK, NEW JERSEY, ASSIGNOR TO FREDERICK CONLIN, OF ELIZABETHPORT, NEW JERSEY.

DRIVING MECHANISM.

1,351,999.   Specification of Letters Patent.   Patented Sept. 7, 1920.

Application filed June 19, 1915. Serial No. 35,028.

*To all whom it may concern:*

Be it known that I, HARRY E. HEATH, of Newark, in the county of Essex, and in the State of New Jersey, have invented a certain new and useful Improvement in Driving Mechanism, and do hereby declare that the following is a full, clear, and exact description thereof.

My invention relates to a driving mechanism which is especially useful in connection with marine torpedoes, aeroplanes or submarines.

The object of my invention is to provide a driving mechanism adapted to drive shafts in opposite directions, especially shafts which are arranged concentrically, the object of my invention being especially to provide such a driving mechanism where there are two driving means which are driven in opposite directions, as, for example, two propellers. A further object of my invention is to provide a construction of the above character, which is especially applicable for driving propellers in opposite directions, as, for example, on a marine torpedo where it is desired to prevent the rotation of the torpedo as a whole in the water, and in a similar way on submarines where a similar effect is to be avoided. It is also equally useful in aeroplanes where it is desirable to maintain the lateral as well as the longitudinal equilibrium. A further object of my invention is to provide a driving mechanism of this character in which the two shafts may be driven at the same speed with relation to the casing, as, for example, the torpedo shell containing the same.

While my invention is capable of embodiment in many different forms, for the purposes of illustration I have shown only one form thereof in the accompanying drawings, in which—

The figure is a cross-section of a torpedo made in accordance with my invention.

My invention is not confined to any particular type of motor, nor is it confined to the use of any particular motive fluid, but for the purposes of illustration I shall describe my invention as applied to a marine torpedo, driven by an electric motor.

In the drawings I have shown a torpedo casing 1 having on the rear thereof a guard 2 for a forward propeller 3, and a rear propeller 4 which are adapted to rotate in opposite directions and which, therefore, are made in the shape of right and left-handed screws. The rear propeller 4 is located on a main motor shaft 5, on which there is located an armature 6, preferably supported in ball bearings 7. The ball bearings 7 are supported in a rotatable motor casing 8 attached to a sleeve 9 surrounding the shaft 5, connected to the forward propeller 3 so as to drive the same. The motor casing 8 is itself supported preferably in ball bearings 10 from the torpedo casing 1. This motor casing 8 carries field coils 11 and 12 which are supplied with current from a slip-ring 13 which bears against the side of the motor casing 8 so as to contact with a terminal 14 connected to the coils 12. The other terminal of the coils is connected to a brush 15, which is supported against terminals 16 on the armature 6 while the current passes out from a brush 17 supported against said terminal 16 and connected to a terminal on the motor casing 8, which is in contact with a slip-ring 18, said brushes being supported in any suitable manner from casing 8. The slip-rings 13 and 18 are connected respectively by wires 19 and 20 to a series of battery cells 21, which are themselves connected together by wires 22. The battery cells 21 may be of any desired type, but preferably they are constructed in the manner set forth in my co-pending application upon electric batteries, Serial No. 31,118, filed May 29th, 1915. While it is not necessary, in accordance with my invention, to provide any means for driving the shafts 5 and 9 and the propellers attached thereto at the same speed, I may provide means for accomplishing this end so as to avoid any slight differences in speed which might occur owing to the differences in friction and load on the two shafts 5 and 9, and the parts connected thereto. In order to accomplish this purpose when desired, however, I may provide on the forward end of the shaft 5 a beveled gear 22, meshing with a beveled gear 23 supported upon a stud shaft located on a partition 24 extending transversely across the body of the torpedo. The gear 23 is arranged to mesh with a beveled gear 25, attached to the motor casing 8. As shown in the drawings, the gears 22 and 25 are of the same size.

The remainder of the torpedo may be constructed in any suitable manner so as to provide any or all the controlling devices now known to be useful in marine torpedoes. I have not shown in detail the remaining features of the construction, as such other details do not form a portion of my invention.

While I have described my invention above in detail, I wish it to be understood that many changes may be made therein without departing from the spirit of my invention.

I claim:

In combination, a motor armature and field winding, a rotatable shaft carrying one of said motor elements, a casing rotatably mounted on said shaft and carrying the other of said elements, hubs on said casing, a partition having a fixed bearing for one of said hubs, bevel gears mounted upon said casing and said shaft on opposite sides of said partition, and an intermediate gear carried by said partition and meshing with said first mentioned gears.

In testimony that I claim the foregoing I have hereunto set my hand.

HARRY E. HEATH.

Witnesses:
 ARTHUR WRIGHT,
 AGNES F. McLAUGHLIN.